(12) United States Patent
Streuer et al.

(10) Patent No.: US 6,646,416 B2
(45) Date of Patent: Nov. 11, 2003

(54) ELECTRICAL RECHARGEABLE BATTERY

(75) Inventors: Peter Streuer, Hannover (DE); Peter Schellenberg, Wunstorf (DE)

(73) Assignee: VB Autobatterie GmbH, Hannover (DE)

(*) Notice: Subject to any disclaimer, the term of this patent is extended or adjusted under 35 U.S.C. 154(b) by 0 days.

(21) Appl. No.: 10/146,183

(22) Filed: May 15, 2002

(65) Prior Publication Data

US 2002/0171395 A1 Nov. 21, 2002

(30) Foreign Application Priority Data

May 17, 2001 (DE) .......................................... 101 24 168

(51) Int. Cl.$^7$ ................................................. H02J 7/00
(52) U.S. Cl. ........................................................ 320/107
(58) Field of Search ............................. 320/107; 429/1, 429/121, 123, 65, 178, 183

(56) References Cited

U.S. PATENT DOCUMENTS

| | | | | |
|---|---|---|---|---|
| 4,385,100 A | * | 5/1983 | Hooke et al. | 429/183 |
| 4,693,948 A | * | 9/1987 | McEwan | 429/121 |
| 4,898,796 A | * | 2/1990 | Furukawa et al. | 429/178 |
| 5,346,408 A | | 9/1994 | Chupak | 439/522 |
| 6,025,088 A | | 2/2000 | Kump | 429/121 |
| 6,232,016 B1 | * | 5/2001 | Fink | 429/178 |

FOREIGN PATENT DOCUMENTS

| | | |
|---|---|---|
| DE | 1 032 349 | 12/1955 |
| DE | 1 032 349 B | 6/1958 |
| DE | 2645977 | * 4/1978 |
| DE | 28 14 444 | 7/1979 |
| DE | 28 14 444 B1 | 7/1979 |
| DE | 28 14 444 C2 | 7/1979 |
| DE | 35 45 522 C2 | 6/1986 |
| DE | 198 19 365 | 11/1999 |
| DE | 198 19 365 A1 | 11/1999 |
| JP | 11-86840 | 3/1999 |
| JP | 11-86840 A | 3/1999 |

OTHER PUBLICATIONS

European Search Report Dated Oct. 1, 2002.

* cited by examiner

Primary Examiner—Edward H. Tso
Assistant Examiner—Pia Tibbits
(74) Attorney, Agent, or Firm—Foley & Lardner

(57) ABSTRACT

An electrical rechargeable battery has an end pole, which is provided with an external thread and to which a flat cable lug of a cable connection is connected. The end pole is arranged in a circular recess in the cover such that the end pole is surrounded on all sides by the plastic material of the cover and is accessible only from above and through at least one narrow slot, through which a flat cable connection can be inserted. A covering cap, which is designed to be insulating at least in the region which is accessible from above, is screwed onto the end pole. The covering cap is attached to the cover.

7 Claims, 2 Drawing Sheets

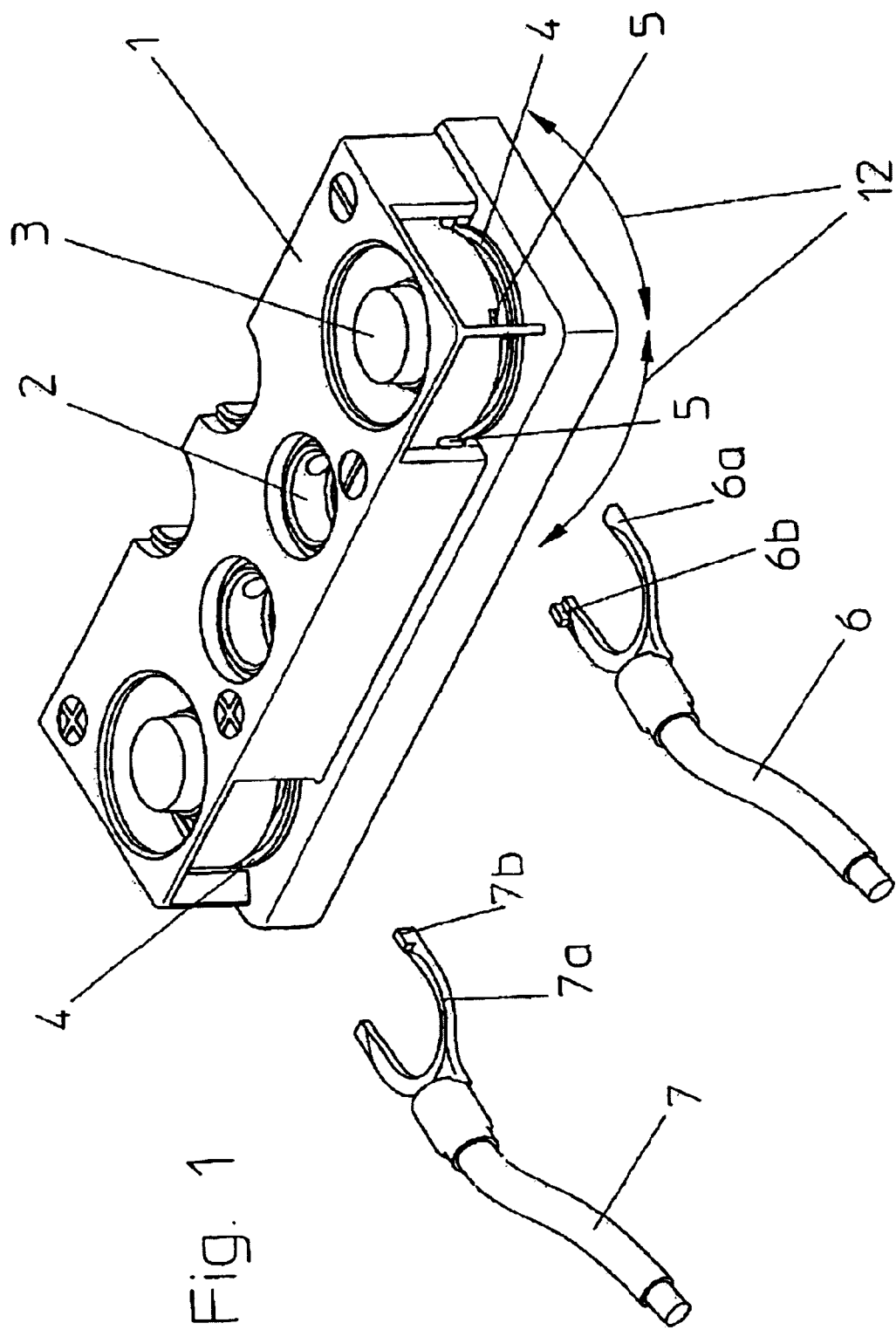

ELECTRICAL RECHARGEABLE BATTERY

RELATED APPLICATION

This application claims priority of German Patent Application No. 101 24 168.2, filed May 17, 2001.

FIELD OF THE INVENTION

This invention relates to an electrical rechargeable battery having an end pole which is provided with an external thread, to which a flat cable lug of a cable connection is connected.

BACKGROUND

End poles and cable connections for electrical rechargeable batteries, in particular, for starter batteries, are known in widely varying embodiments. For example, DE 2814444 C2 discloses an end pole which is provided with an external thread, to which a flat cable lug is screwed and which is covered by a covering cap.

DE 3545522 C2 likewise discloses an end pole with an external thread, which is screwed to flat cable lugs which are provided with incorrect connection protection devices.

These arrangements have the disadvantage that they project beyond the battery covering outline and can, thus, easily be damaged when batteries are stacked. Furthermore, inadequate protection is provided against direct contact, as is particularly important when the battery voltages are relatively high.

It would accordingly be advantageous to provide a rechargeable battery with an end pole and cable connection, which is very largely protected against direct contact, is easy to manufacture, and is also easy to assemble and install.

SUMMARY OF THE INVENTION

This invention relates to an electrical rechargeable battery adapted to connect to at least one substantially flat cable lug of a cable connection including a cover made at least partially from substantially non-conductive material and having a substantially circular recess, an end pole provided with an external thread and arranged in the circular recess in the cover such that the end pole is surrounded on all sides by the substantially non-conductive material of the cover and is accessible only from above and through at least one narrow slot in the cover through which a flat cable connection can be inserted, and a covering cap which may be screwed onto the end pole to substantially isolate a region which is accessible from above.

BRIEF DESCRIPTION OF THE DRAWINGS

The subject matter of the invention will be explained in more detail in the following text with reference to the figures, wherein:

FIG. 1 is a perspective view of a rechargeable battery cover made of plastic, and associated cable connection.

DETAILED DESCRIPTION

Figure 2B:
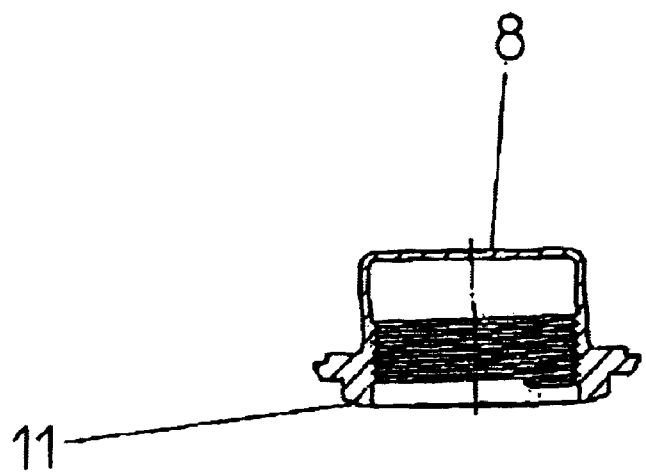
FIG. 2 collectively shows 1) a section through the end pole (FIG. 2a), and shows the corresponding covering cap, 2) in the form of a section (FIG. 2b) and 3) illustrated in perspective (FIG. 2c).

It will be appreciated that the following description is intended to refer to specific embodiments of the invention selected for illustration in the drawings and is not intended to define or limit the invention, other than in the appended claims.

Figure 2A:
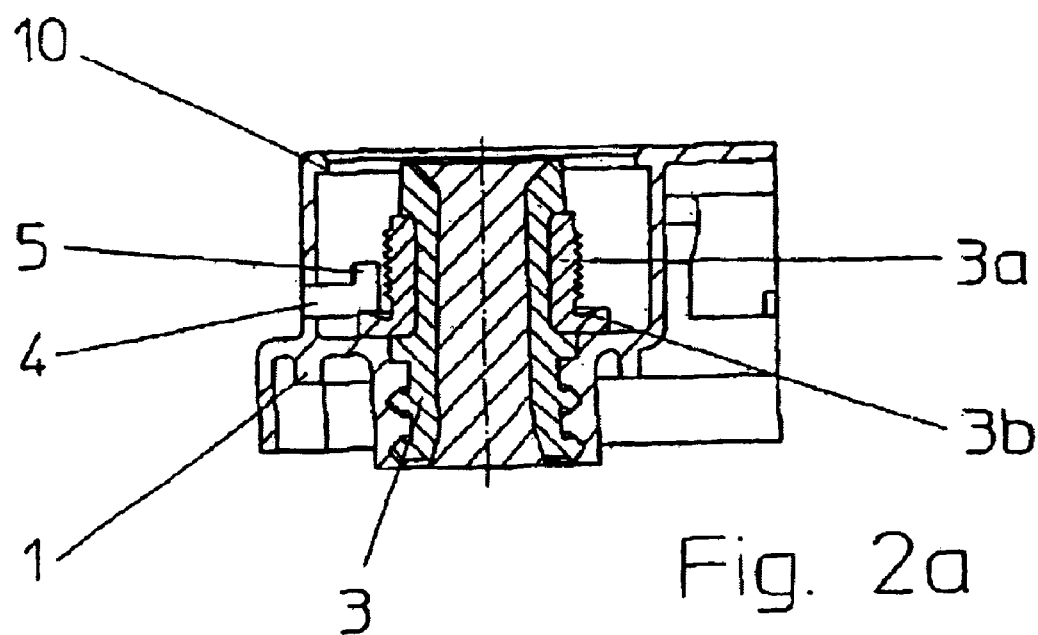
Figure 2C:
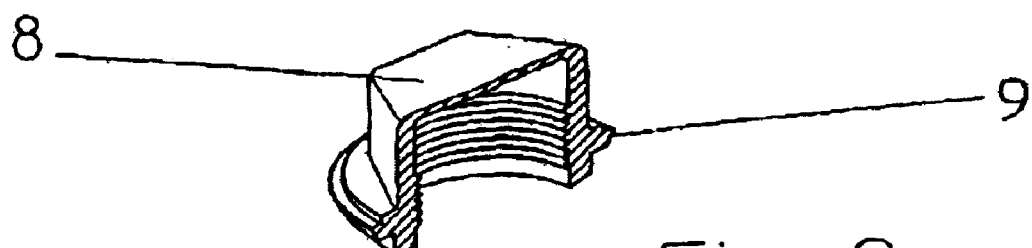

According to the invention, end pole 3 is arranged in a recess in cover 1, which also contains normal filling openings (2). The circular recess surrounds end pole 3 on all sides. End pole 3 is, thus, accessible only from above and for the cable connection. Flat slots 4 are provided in the lower region of the cover recess for the cable connection, so that they correspond with contact surface 3b on end pole 3 (FIG. 2a). Particularly, when end pole 3 is arranged in a typical position at the corner of the rechargeable battery housing, there are two such narrow slots 4, which allow access to end pole 3.

Flat connecting lugs or cable lugs 6a, 7a on connecting cables 6 and 7, which are U-shaped, can be inserted through narrow slots 4. To prevent confusion between the positive and negative connecting cables for the associated end pole, connecting lugs 6a and 7a are provided with tabs 6b and 7b, which are fitted such that they are asymmetric for the positive and negative cable connections. Asymmetrically fitted cutouts 5 in the region of flat slots 4 likewise correspond with tabs 6b and 7b.

In a manner which is known per se, end pole 3 has on its outer surface a threaded sleeve 3a which is composed, for example, of lead-coated brass. A covering cap 8 is screwed onto end pole 3 to ensure complete protection against direct contact. This is either completely composed of a hard plastic, such as a thermosetting plastic or filled polypropylene, or is provided with an insulating material, at least in the region which is accessible from above. It is also possible to use a covering cap composed of plastic with a metallic threaded insert.

The lower edge of covering cap 8 is in the form of a projecting collar 9. A corresponding, preferably circumferential, snap-action edge 10 is provided on the cover recess, by means of which covering cap 8 is attached to the cover. interacts with the corresponding chamfer 3b on the lower face of threaded sleeve 3a. In addition, the U-shaped limbs of flat cable connections 6a, 7a may also have the same chamfer, which considerably improves the electrical contact with the end pole.

As is indicated by the arrow 12 in FIG. 1, the cable connection which is inserted through narrow slot 4 can be rotated about the pole axis within the angle that is predetermined by the slot width.

Covering caps 8 may be provided with safety indications, such as a colored marking to indicate the polarity, and/or inscriptions to define specific torque limits for securing them. The configuration of the end pole and cover according to the invention ensures a high level of safety against accidental direct contact with the end pole. It is impossible to confuse a battery designed according to the invention, which in particular has a higher voltage (36 volts) than normal batteries, with a normal starter battery (12 volts). It is also impossible to connect a starting jumper cable that is intended for 12 volt batteries. The specific configuration of the flat cable connections, in conjunction with the configuration of the insertion slot, makes it possible to prevent incorrect connection of the pole connections. With the cover according to the invention, the cable connection can easily be fitted in the vehicle simply by screwing on the covering cap, which is held in a captive manner in the cover.

What is claimed is:

1. An electrical rechargeable battery adapted to connect to at least one substantially flat cable lug of a cable connection comprising:

a cover made at least partially from substantially non-conductive material and having a substantially circular recess;

an end pole provided with an external thread and arranged in the substantially circular recess in the cover such that the end pole is surrounded on all sides by the substantially non-conductive material of the cover and is accessible only through the substantially circular recess and at least one narrow slot in the cover through which the flat cable connection can be inserted; and a covering cap which may be screwed onto the end pole at the substantially circular recess.

2. The electrical rechargeable battery according to claim 1, wherein the covering cap is attached to the cover.

3. An electrical rechargeable battery adapted to connect to at least one substantially flat cable lug of a cable connection comprising:

a cover made at least partially from substantially non-conductive material and having a substantially circular recess;

an end pole provided with an external thread and arranged in the substantially circular recess in the cover such that the end pole is surrounded on all sides by the substantially non-conductive material of the cover and is accessible only through the substantially circular recess and at least one narrow slot in the cover through which the flat cable connection can be inserted;

a covering cap which may be screwed onto the end pole at the substantially circular recess, wherein the covering cap is attached to the cover; and a projecting collar on the covering cap which "snaps" into position at an edge of the recess.

4. The electrical rechargeable battery according to claim 1, wherein the covering cap is made from a hard plastic material.

5. The electrical rechargeable battery according to claim 1, wherein the slot is in the form of a cutout arranged asymmetrically for positive and negative connecting poles.

6. The electrical rechargeable battery according to claim 5, wherein the flat cable lug has a tab shaped to correspond to the shape of the cutout.

7. The electrical rechargeable battery according to claim 1, wherein the covering cap has a chamfer in a region adjacent the cable lug when in position.

* * * * *